Oct. 26, 1926.
G. LEHMANN
1,604,293
SLIDING CASTER
Filed Jan. 4, 1926
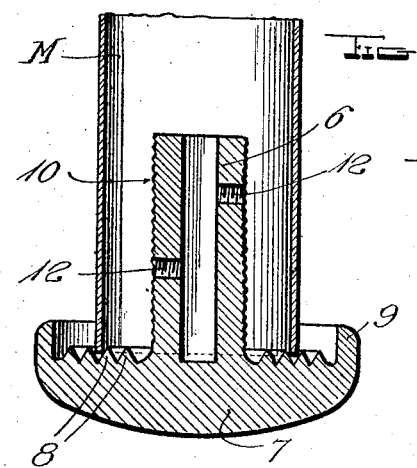
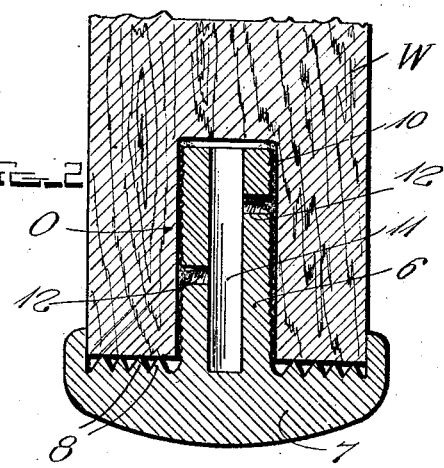
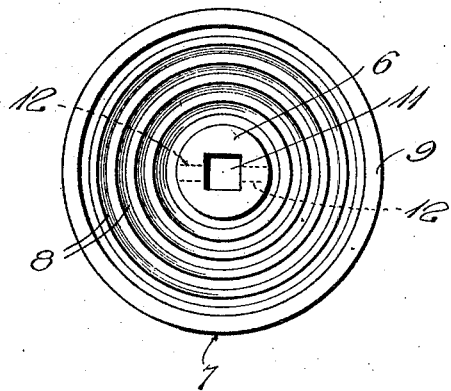
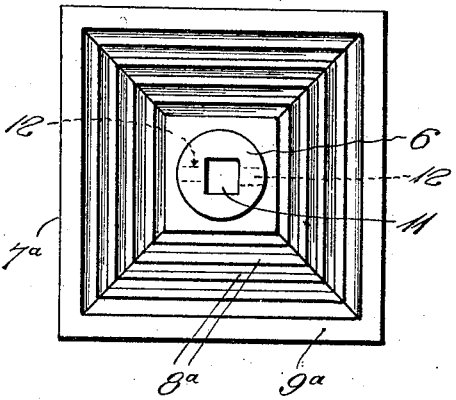
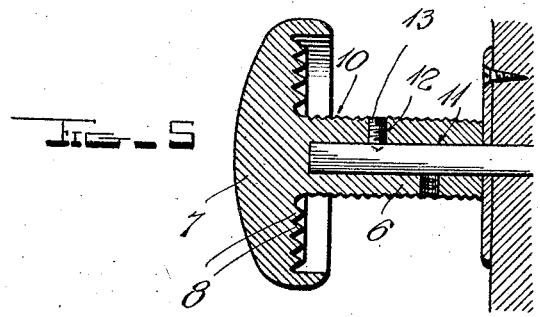
Inventor
George Lehmann, Patented Oct. 26, 1926.

1,604,293

UNITED STATES PATENT OFFICE.

GEORGE LEHMANN, OF MAYWOOD, ILLINOIS.

SLIDING CASTER.

Application filed January 4, 1926. Serial No. 79,114.

Sliding casters commonly used for the legs of furniture and usually formed of glass, though often constructed from other materials, are provided with a shank for reception in the lower end of the leg, said shank being provided with a head on its lower end upon which the leg rests. Unless the shank fits the opening in the leg snugly, the caster moves to an off-center position with respect to the leg when the article of furniture is moved, producing an unsightly appearance, unless the article is lifted and the caster restored to a central position. This is particularly true, when sliding casters of the type set forth, are used upon the legs of metal bedsteads. It is the object of my invention, to provide an exceptionally simple and inexpensive, yet an efficient and reliable construction, for always insuring proper centering of the caster with respect to the leg, even though the caster shank may be much smaller than the interior of the leg.

With the foregoing in view, the invention resides in the novel subject matter hereinafter described and claimed, the description being supplemented by the accompanying drawing.

Figure 1 is a vertical sectional view showing one of the improved casters engaged with the lower end of one of the metal legs of a bed.

Figure 2 is a view similar to Fig. 1 but showing the manner in which the caster may be used in connection with a wooden leg.

Figure 3 is a top plan view of the caster.

Figure 4 is a view similar to Fig. 3 but showing a caster of different shape.

Figure 5 is a detail sectional view illustrating the manner in which the caster may be used as a door knob.

In the construction detailed in Figs. 1, 2 and 3, the numeral 6 designates a shank having an enlarged head 7 on its lower end, the upper side of said head being disposed at substantially right angles to the shank and being provided with a plurality of ridges 8 which extend continuously about said shank and are spaced different distances therefrom. At the periphery of the head 7, an annular upstanding flange 9 is provided, said flange being of greater height than said ridges. When the shank 6 is received in the leg of an article of furniture, said leg engages the ridges 8 and if the leg be formed of wood as indicated at W in Fig. 2, these corrugations will slightly bite into the wood and will assist in holding the caster in centered relation with the leg, even though the shank 6 may rather loosely engage the opening O in the leg. Ordinarily, however, if circumstances permit, the shank is cemented in the opening O, said shank being by preference externally roughened as indicated at 10, to permit the cement to more effectively hold. The flange 9 surrounds the lower extremity of the leg W, giving a good appearance, and if said leg be of the proper size, the flange will contact with it, thereby having a tendency to prevent splitting of said leg.

If the caster is used in connection with a metal leg M as shown in Fig. 1, the lower end of the latter will so engage one or more of the ridges 8, as to be properly centered by the latter, preventing the caster from moving to an off-center position when the article of furniture is moved. Regardless of the size of the leg M, it will effectively engage one or more of the ridges 8 and hence the invention is well adapted for use either with ordinary iron beds, or with brass beds, having relatively large legs.

As will be clear by reference to Fig. 4, the head need not be of circular form. This figure discloses a square head $7^a$ whose ridges $8^a$ and flange $9^a$ are continuous and are disposed in parallel relation with the edges of the head.

In either design of construction, above described, the shank is preferably formed with a longitudinal opening 11, through which a suitable tool may be inserted to remove the shank from the furniture, should it be cemented in place and become broken from the head. This opening is preferably of such shape as to permit use of the device as a door knob, as illustrated in Fig. 5. Transverse openings 12 which are formed in the shank, act to receive the usual screws 13 for securing the knob in place and when the relation shown in Fig. 2 is employed, some of the cement may well find its way into these openings, to more effectively hold the caster in place.

It will be seen from the foregoing that while the invention is very simple and inexpensive, it will be efficient and very desirable. While excellent results may be obtained from the details disclosed, variations may be made within the scope of the invention as claimed.

I claim:—

1. In a sliding caster having a shank for reception in a furniture leg and a head on said shank to underlie the leg; a plurality of ridges on the upper side of said head spaced about and different distances from said shank for the purpose set forth.

2. A sliding caster comprising a shank for reception in a furniture leg, a head on the lower end of said shank having an upper side at substantially right angles to the shank, said head being provided at its periphery with a continuous upstanding flange and having on said upper side a plurality of continuous ridges extending about and spaced different distances from said shank, said ridges being of less height than said flange.

In testimony whereof I have hereunto affixed my signature.

GEORGE LEHMANN.